US011123244B2

(12) United States Patent
Lin (10) Patent No.: US 11,123,244 B2
(45) Date of Patent: Sep. 21, 2021

(54) ELECTRIC WHEELCHAIR CONTROL SYSTEM AND ELECTRIC WHEELCHAIR CONTROL METHOD (71) Applicant: INDUSTRIAL TECHNOLOGY RESEARCH INSTITUTE, Hsinchu (TW)

(72) Inventor: Yi-Ling Lin, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 349 days.

(21) Appl. No.: 16/200,893

(22) Filed: Nov. 27, 2018

(65) Prior Publication Data

US 2020/0121527 A1 Apr. 23, 2020

(30) Foreign Application Priority Data

Oct. 17, 2018 (TW) .................. 107136594

(51) Int. Cl.
*A61G 5/10* (2006.01)
*H02P 3/18* (2006.01)
(Continued)

(52) U.S. Cl.
CPC ........... *A61G 5/1008* (2013.01); *A61G 5/045* (2013.01); *A61G 5/1032* (2013.01);
(Continued)

(58) Field of Classification Search
CPC .... A61G 5/1008; A61G 5/045; A61G 5/1032; A61G 2203/42; A61G 5/048;
(Continued)

(56) References Cited

U.S. PATENT DOCUMENTS 2,482,203 A    9/1949  Peterson et al.
3,921,741 A   11/1975  Garfinkle et al.
(Continued)

FOREIGN PATENT DOCUMENTS

CN    1915705 A    2/2007
CN  103126830 A    6/2013
(Continued)

OTHER PUBLICATIONS

Taiwan Patent Office, "Notice of Allowance", dated Aug. 8, 2019, Taiwan.
(Continued)

*Primary Examiner* — Jess Whittington
*Assistant Examiner* — Brian E Yang
(74) *Attorney, Agent, or Firm* — Locke Lord LLP; Tim Tingkang Xia, Esq.

(57) ABSTRACT

An electric wheelchair control system is adapted to control a wheelchair and comprises a sensing assembly, an inertial sensor, a controller, a motor driver, and a three-phase AC motor. The sensing assembly is configured to detect an external force applied to the wheelchair and generate a first sensed signal based thereon. The inertial sensor is configured to detect an inclination of the wheelchair and generate a second sensed signal based thereon. The controller selectively outputs a PWM braking signal to the motor driver according to the first sensed signal and the second sensed signal, and the PWM braking signal includes an upper arm braking signal and a lower arm braking signal, wherein the upper arm braking signal and the lower arm braking signal have the same duty cycle and when the upper arm braking signal is at a high level, the lower arm braking signal is at a low level.

14 Claims, 9 Drawing Sheets

(51) Int. Cl.
*A61G 5/04* (2013.01)
*B60L 15/20* (2006.01)

(52) U.S. Cl.
CPC ............ *B60L 15/2018* (2013.01); *H02P 3/18* (2013.01); *A61G 2203/42* (2013.01); *B60L 2200/34* (2013.01); *B60L 2220/10* (2013.01); *B60L 2220/42* (2013.01); *B60L 2240/12* (2013.01); *B60L 2240/42* (2013.01)

(58) Field of Classification Search
CPC ...... A61G 5/1035; A61G 5/1051; A61G 5/04; A61G 2203/10; H02P 3/18; B60L 15/2018; B60L 2220/10; B60L 2220/42; B60L 2240/12; B60L 2240/42; B60L 2200/34; Y02T 10/64; Y02T 10/72
See application file for complete search history.

(56) References Cited

U.S. PATENT DOCUMENTS

| | | | |
|---|---|---|---|
| 4,407,393 | A | 10/1983 | Youdin et al. |
| 4,511,825 | A | 4/1985 | Klimo |
| 5,253,724 | A | 10/1993 | Prior |
| 6,072,292 | A | 6/2000 | Uchiyama et al. |
| 6,138,801 | A | 10/2000 | Shirai et al. |
| 6,247,548 | B1 * | 6/2001 | Hayashi ............... H02K 11/048 180/206.2 |
| 6,471,231 | B1 | 10/2002 | Hargroder |
| 6,494,278 | B1 | 12/2002 | Weisz |
| 6,560,515 | B2 | 5/2003 | Inoue |
| 6,674,256 | B2 | 1/2004 | Choi et al. |
| 7,144,025 | B2 | 12/2006 | Wakita et al. |
| 7,708,120 | B2 | 5/2010 | Einbinder |
| 8,033,955 | B2 | 10/2011 | Farnsworth |
| 9,774,290 | B2 | 9/2017 | Dhawan |
| 2015/0084551 | A1 * | 3/2015 | Hayashi ............... H02M 7/539 318/8 |
| 2015/0298765 | A1 * | 10/2015 | Golden, Jr. ............... A61G 5/10 180/206.3 |
| 2017/0172491 | A1 | 6/2017 | Wu et al. |
| 2017/0281440 | A1 * | 10/2017 | Puvogel ................ A61G 7/005 |
| 2018/0154760 | A1 | 6/2018 | Hu et al. |
| 2018/0163819 | A1 | 6/2018 | Lee et al. |
| 2020/0094693 | A1 * | 3/2020 | Caro Suarez .......... B62K 5/027 |

FOREIGN PATENT DOCUMENTS

| | | |
|---|---|---|
| CN | 206379830 U | 8/2017 |
| CN | 107343833 A | 11/2017 |
| CN | 207785382 U | 8/2018 |
| CN | 207950041 U | 10/2018 |
| JP | H10248877 A | 9/1998 |
| JP | 2001070356 A | 3/2001 |
| KR | 20020048592 A | 6/2002 |
| TW | I396641 B | 5/2013 |
| TW | I412223 B | 10/2013 |
| TW | I491390 B | 7/2015 |
| TW | I561430 B | 12/2016 |

OTHER PUBLICATIONS

P. L. Rongmei et al., A Novel Fast Braking System for Induction Motor, International Journal of Engineering and Innovative Technology, 2012, vol. 1. Issue 6.

Hirokazu Seki et al., Capacitor regenerative braking control of power-assisted wheelchair for safety downhill road driving, Proceedings of the 3rd IEEE RAS & EMBS, International Conference on Biomedical Robotics and Biomechatronics, 2010.

Dan Ding et al., Electric powered wheelchairs, IEEE Control System Magazine, 2005.

Hirokazu Seki et al., Novel Regenerative Braking Control of Electric Power-Assisted Wheelchair for Safety Downhill Road Driving, IEEE Transactions on Industrial Electronics, 2009, vol. 56, No. 5.

Yasuhisa Hirata et al., Steering assist system for a cycling wheelchair based on braking control, IEEE/RSJ International Conference on Intelligent Robots and Systems, 2013.

* cited by examiner

ELECTRIC WHEELCHAIR CONTROL SYSTEM AND ELECTRIC WHEELCHAIR CONTROL METHOD

CROSS-REFERENCE TO RELATED APPLICATIONS

This non-provisional application claims priority under 35 U.S.C. § 119(a) on Patent Application No(s). 107136594 filed in Republic of China on Oct. 17, 2018, the entire contents of which are hereby incorporated by reference.

BACKGROUND

1. Technical Field

This disclosure relates to a motor control system, especially for a motor control system and a method thereof adapted to a wheelchair.

2. Related Art

A wheelchair is an important walker tool for the elderly or disabled person. When the wheelchair travels on a sloped ground, the sliding force of the wheelchair will cause the wheelchair to accelerate, which makes an occupant control the wheelchair difficultly, so that the occupant must need a caregiver to drive the wheelchair.

At present, wheelchair brakes have multiple types. One type of the wheelchair brakes has a slope sensor which can be used to know an inclination of a ground by the slope sensor. When the ground is detected as a sloped ground by the slope sensor, a hydraulic or electronic brake can be enabled to inhibit a movement of the wheelchair. However, the hydraulic and electronic brakes have certain volumes, so it is harmful to the minimizing the wheelchair brake. Another type of the wheelchair brakes applies a constant direction voltage to a coil of one phase of the three-phase motors by a controller, thereby causing the three-phase motor to be immediately locked to prevent the movement of the wheelchair, although no hydraulic brake or electronic brake is required to be installed on the wheelchair, but this braking way make the occupant feel uncomfortable.

Therefore, there is indeed a need for an improved electric wheelchair control system and a method thereof, which can at least improve the above disadvantages.

SUMMARY

Accordingly, this disclosure provides an electric wheelchair control system and an electric wheelchair control method, the electric wheelchair control system gradually reduces a rotation of a rotor by outputting a pulse width modulation braking signal, so that an occupant does not feel uncomfortable while the wheelchair is braked. On the other hand, there is no need to install additional brakes, which is advantageous to minimizing the control system.

According to one or more embodiment of this disclosure, an electric wheelchair control is adapted to control a wheelchair. The wheelchair comprises a chair and a wheel assembly, and the wheelchair is configured to contact with a ground. The electric wheelchair control system comprises a sensing assembly and a power device, the sensing assembly is configured to assembled with the wheel assembly to detect a magnitude and a direction of an external force and generate a first sensed signal based thereon. The power device is electrically connected with the sensing assembly and configured to connect between the chair and the wheel assembly. The power device further comprises an inertial sensor, a three-phase alternating current motor, a motor and a controller. The inertial sensor is configured to detect an inclination of the chair relative to a horizontal plane and generate a second sensed signal based thereon. The three-phase alternating current motor has a rotor configured to assemble with the wheel assembly and a stator configured to assemble with the chair. The motor driver is electrically connected with the three-phase alternating current motor. The controller is electrically connected with the inertial sensor, the sensing assembly and the motor driver. The controller selectively outputs a pulse width modulation (PWM) braking signal to the motor driver according to the first sensed signal and the second sensed signal, and the motor driver restrains a rotation of the rotor according to the PWM braking signal. The PWM braking signal includes an upper arm braking signal and a lower arm braking signal, and the upper arm braking signal and the lower arm braking signal have identical duty ratios. The lower arm braking signal is at a low level when the upper arm braking signal is at a high level. An upper arm driver of the motor driver receiving the upper arm braking signal and a lower arm driver of the motor driver receiving the lower arm braking signal belong to an identical phase.

According to one or more embodiment of this disclosure, an electric wheelchair control method is adapted to control a wheelchair and performed by an electric wheelchair control system. The wheelchair comprises a chair and a wheel assembly, the electric wheelchair control system including a sensing assembly, an inertial sensor, a three-phase alternating current motor, a motor driver and a controller, and the electric wheelchair control method comprises detecting a magnitude and a direction of an external force applied to the wheel assembly and generating a first sensed signal based thereon by the sensing assembly, detecting an inclination of the chair relative to a horizontal plane and generating a second sensed signal based thereon by the inertial sensor, determining whether the external force is zero by the controller according to the first sensed signal, determining the direction of the external force toward a rear end of the chair or a front end of the chair by the controller according to the first sensed signal when the external force is not zero, determining whether a ground where the wheelchair is located has a slope by the controller according to the second sensed signal; and outputting a PWM braking signal to the motor driver by the controller when the direction of the external force is toward the rear end of the chair and the ground has a slope. The motor driver restrains a rotation of a rotor of the three-phase alternating current motor according to the PWM braking signal, the PWM braking signal includes an upper arm braking signal and a lower arm braking signal, the upper arm braking signal and the lower arm braking signal have identical duty ratios, the lower arm braking signal is at a low level when the upper arm braking signal is at a high level, and an upper arm driver of the motor driver receiving the upper arm braking signal and a lower arm driver of the motor driver receiving the lower arm braking signal belong to an identical phase.

In view of the above description, the controller can automatically output a PWM drive signal to the motor driver to drive a rotation of the three-phase AC motor when the wheelchair travels on a sloped ground and an external force applied by a occupant to the wheel assembly is toward the front end of the chair. The three-phase AC motor wheel assembly can drive the wheel assembly to rotate when it rotates. Therefore, the wheelchair still moves forward along the sloped ground even if the occupant does not exert any force to push the wheel assembly. Conversely, the controller can automatically output a PWM braking signal to the motor driver to restrain the rotation of the three-phase AC motor when the wheelchair travels on the sloped ground and the external force applied by the occupant to the wheel assembly is toward the rear end of the chair. As a result, the wheelchair does not slide down along the sloped ground even if the occupant does not push the wheel assembly by himself. On the other hand, since the upper arm braking signal and the lower arm braking signal of the PWM braking signal have identical duty ratios, and the lower arm braking signal is at a low level when the upper arm braking signal is at the high level. Therefore, the upper arm driver and the lower arm driver are not simultaneously turned on, so a current does not flow through the upper arm driver and the lower arm driver at the same time and is only gradually consumed in a loop formed by the upper arm driver or the lower arm driver, which makes a speed of the three-phase AC motor decrease gradually rather than lock it immediately. Therefore, even if the electric wheelchair control system brakes the wheelchair on the sloped ground, the occupant does not feel uncomfortable.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
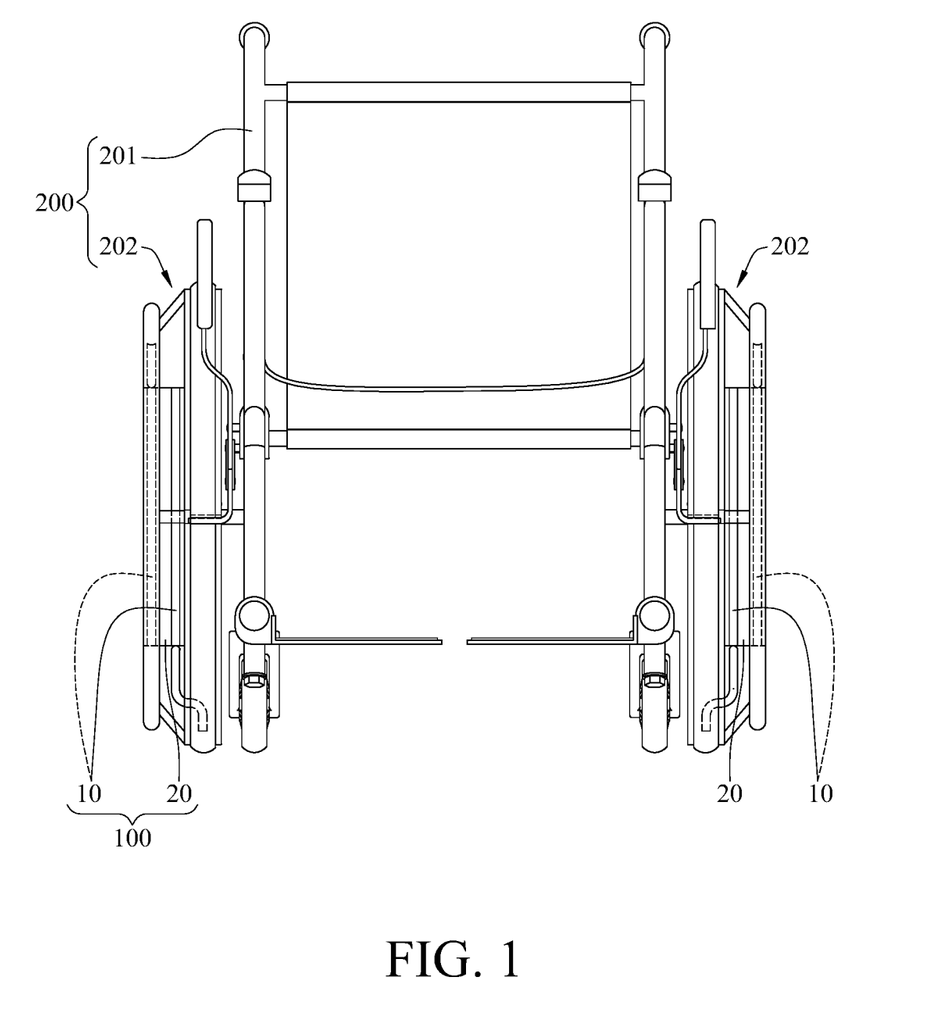
FIG. 1 is a schematic view of an electric wheelchair control system assembled with a wheelchair according to an embodiment of the present disclosure.

Please refer to FIG. 1 which is a schematic view of an electric wheelchair control system assembled with a wheelchair according to an embodiment of the present disclosure. The electric wheelchair control system 100 is applied to control a wheelchair 200, the electric wheelchair control system 100 includes two sensing assemblies 10 and two power devices 20, and the wheelchair 200 includes a chair 201 and a pair of wheel assemblies 202. The two sensing assemblies 10 are respectively assembled with the two wheel assemblies 202, and each of the power devices 20 is configured to connect between the chair 201 and the wheel assembly 202.

Figure 2:
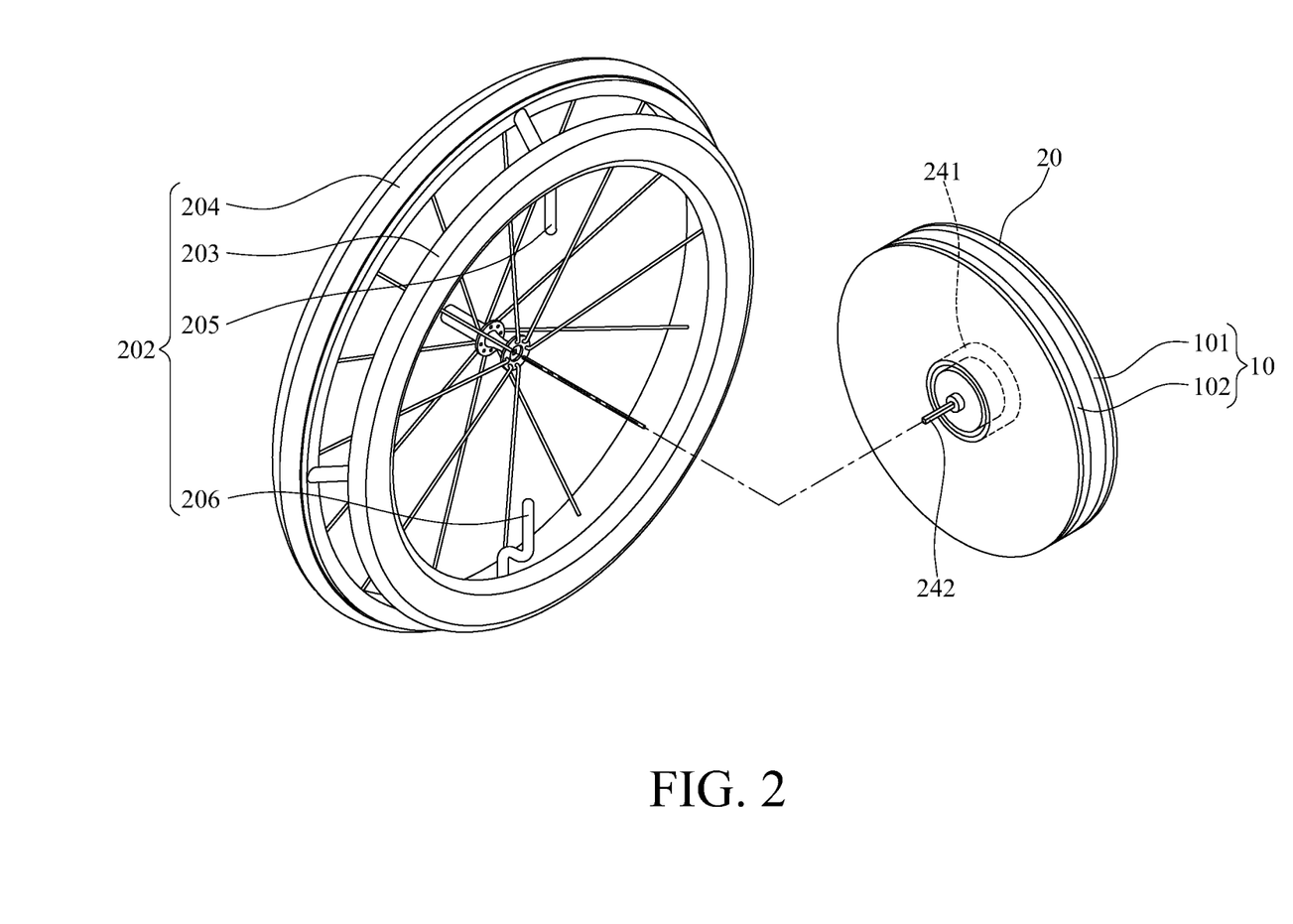
FIG. 2 is a schematic view of a sensing assembly configured to assemble with a wheel assembly of FIG. 1.

Please refer to FIG. 2 which is schematic view of a sensing assembly configured to assemble with a wheel assembly of FIG. 1. Each of the sensing assemblies 10 includes a hand wheel sensor 101 and a road wheel sensor 102. The hand wheel sensor 101 and the road wheel sensor 102 can be film displacement sensors and are spaced apart from each other and attached to a surface of an outer casing of the power device 20. The wheel assembly 202 includes a hand wheel 203 and a road wheel 204 which are disposed coaxially, and a diameter of the hand wheel 203 is smaller than a diameter of the road wheel 204. A wheel frame of the hand wheel 203 and a wheel frame of the road wheel 204 are respectively provided with two pressing members 205 and 206, and each of the pressing members 205 and 206 may be a combination of a steel ball and a spring. The power device 20 is coupled to an axis of the hand wheel 203 and the road wheel 204, whereby the hand wheel 203 and the road wheel 204 are simultaneously driven to rotate by the power device 20. The two pressing components 205 and 206 respectively press the hand wheel sensor 101 and the road wheel sensor 102 at two pressed positions and the two pressed positions are respectively displaced along with the hand wheel 203 and the road wheel 204 when the hand wheel 203 and the road wheel rotate. An absolute value of a difference between a displacement of the pressing component 205 relative to the hand wheel sensor 101 and a displacement of the pressing component 206 relative to the road wheel sensor 102 is proportional to a magnitude of an external force applied by a user to the hand wheel 203. It indicates that a direction of the external force applied by the user to the hand wheel 203 is toward the front end of the chair 201 when the displacement of the pressing component 205 relative to the hand wheel sensor 101 is greater than the displacement of the pressing component 206 relative to the road wheel sensor 102. On the contrary, it indicates that a direction of the external force applied by the user to the hand wheel 203 is toward the rear end of the chair 201 when the displacement of the pressing component 205 relative to the hand wheel sensor 101 is smaller than the displacement of the pressing component 206 relative to the road wheel sensor 102.

Figure 3:
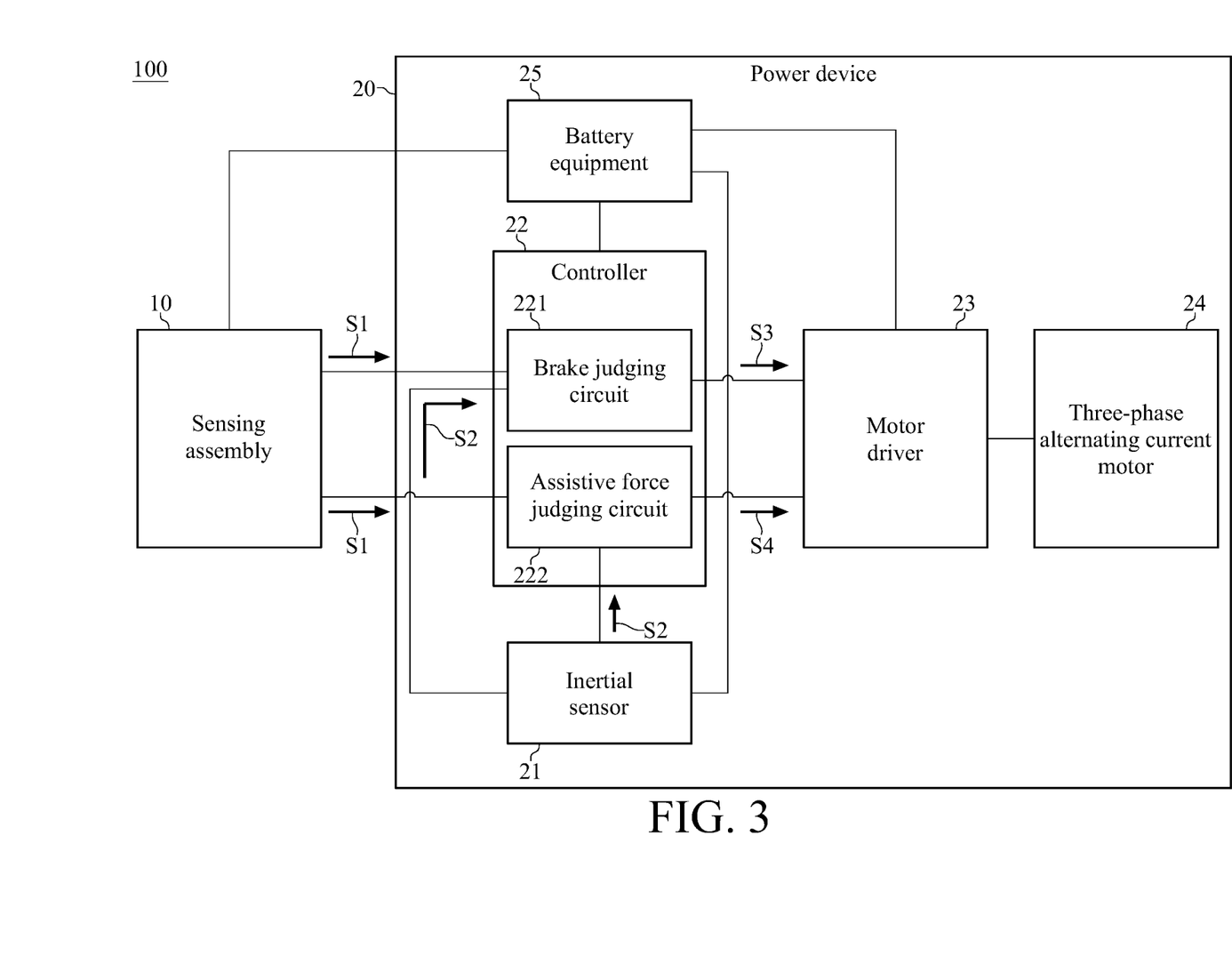
FIG. 3 is a functional block diagram of an electric wheelchair control system according to an embodiment of the present disclosure.

Please refer to FIG. 3 which is a functional block diagram of an electric wheelchair control system according to an embodiment of the present disclosure. The power device 20 can include an inertial sensor 21, a controller 22, a motor driver 23, a three-phase AC motor 24, and a battery equipment 25. The inertial sensor 21 and the sensing assembly 10 are electrically connected to the controller 22, and the controller 22 is further electrically connected to the motor driver 23. The motor driver 23 is electrically connected to the three-phase AC motor 24, and the battery equipment 25 is electrically connected the sensor assembly 10, the inertial sensor 21, the controller 22, the motor driver 23, and the three-phase AC motor 24.

Please refer to FIG. 2 and FIG. 3, the three-phase AC motor 24 can include a stator 241 configured to coupling to the chair 201 (see FIG. 1 together) and a rotor 242 for configured to couple to the wheel assembly 202. In one embodiment, the inertial sensor 21, the controller 22, the motor controller 23, the three-phase AC motor 24, and the battery equipment 25 are packaged in one housing such that the user can conveniently assemble the power device 20 with the chair 201 of the wheelchair 200 or remove the power device 20 from the chair 201 of the wheelchair 200.

The sensing assembly 10 is electrically connected to the power device 20 and calculates a magnitude and a direction of an external force applied by a user to the hand wheel 203 according to the difference between the displacement of the pressing component 205 relative to the hand wheel sensor 101 and the displacement of the pressing component 206 relative to the road wheel sensor 102 for generating a first sensed signal S1, wherein a sensing frequency of the sensing assembly 10 is at least 100 times/second. The inertial sensor 21 can be a combination of an accelerometer, a gyroscope, and a magnetometer. The inertial sensor 21 is configured to detect an inclination of the chair 201 relative a horizontal plane for generating a second sensed signal S2.

The controller 22 can include a brake judging circuit 221 and an assistive force judging circuit 222. The brake judging circuit 221 is electrically connected to the sensing assembly 10 and the inertial sensor 21 to receive the first sensed signal S1 and the second sensed signal S2. The brake judging circuit 221 selectively outputs a pulse width modulation (PWM) braking signal S3 to the motor driver 23 according to the first sensed signal S1 and the second sensed signal S2. The assistive force judging circuit 222 is electrically connected to the sensing assembly 10 and the inertial sensor 21 to receive the first sensed signal S1 and the second sensed signal S2. The assistive force judging circuit 222 selectively outputs a PWM driving signal S4 to the motor driver 23 according to the first sensed signal S1 and the second sensed signal S2.

The battery equipment 25 is electrically connected to the sensing assembly 10, the inertial sensor 21, the controller 22, the motor driver 23, and the three-phase AC motor 24 to provide power for the operations of the sensing assembly 10, the inertial sensor 21, the controller 22, the motor driver 23 and the three-phase AC motor 24. When the power in the battery equipment 25 is not enough, the battery equipment 25 can also be electrically connected to an external power source for charging.

Figure 4:
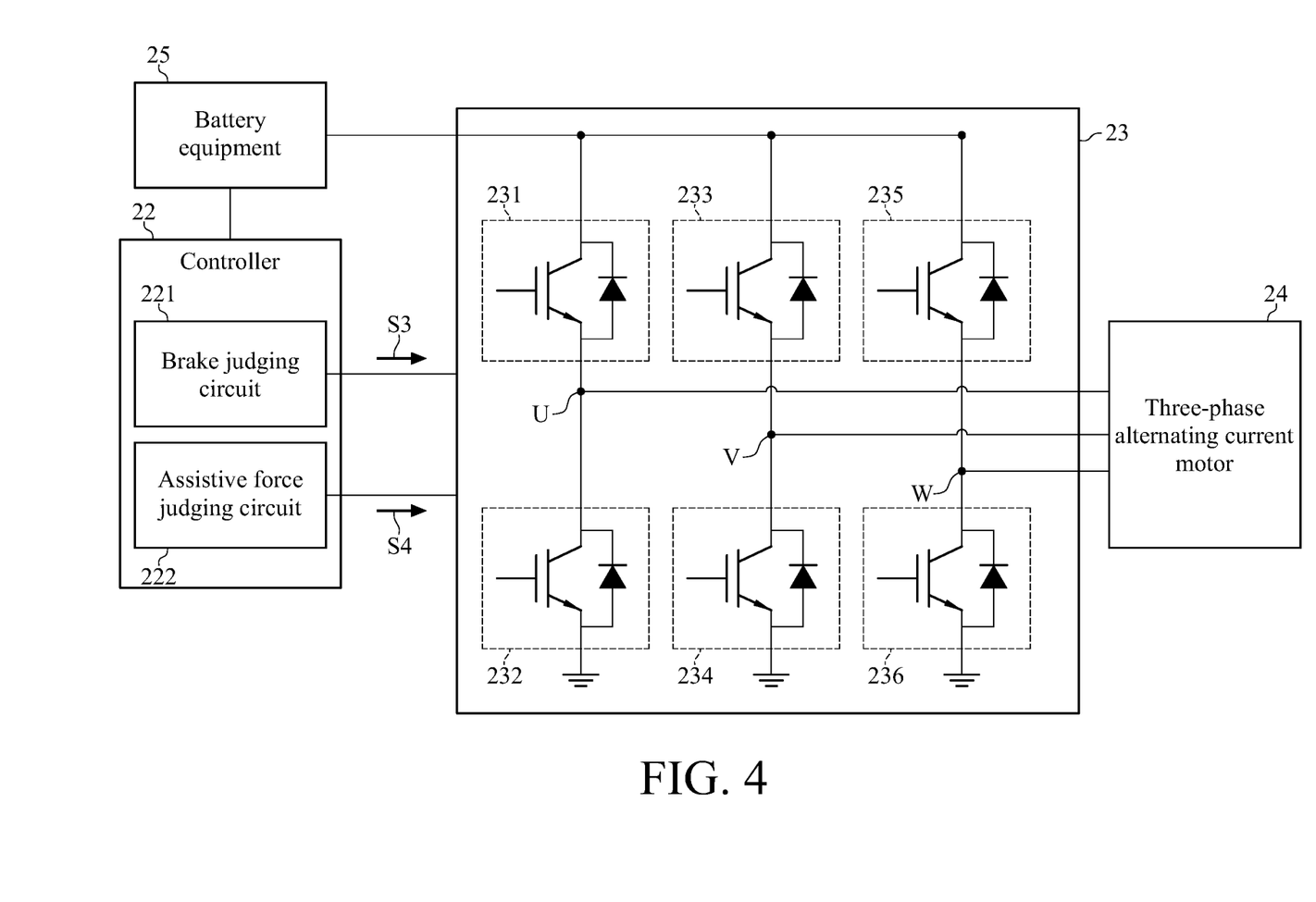
FIG. 4 is a circuit diagram of a motor driver according to an embodiment of the present disclosure.
Figure 5A:
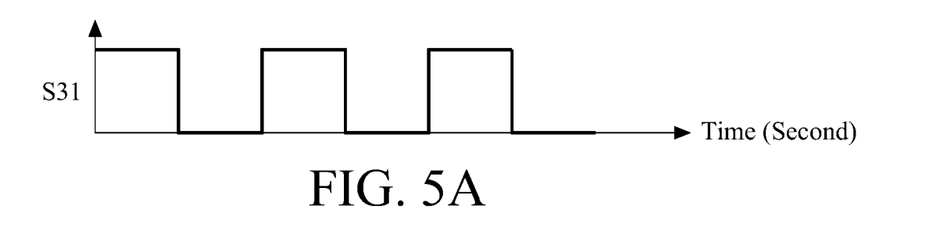
FIGS. 5A-5F are waveform diagrams of a PWM braking signal according to an embodiment of the present disclosure.
Figure 5B:
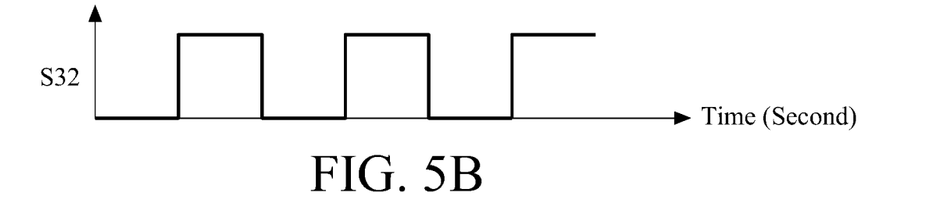
Figure 5C:
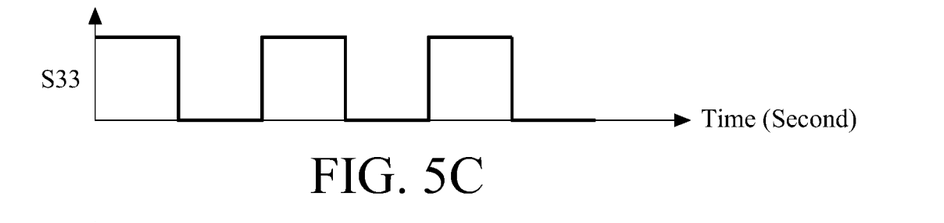
Figure 5D:
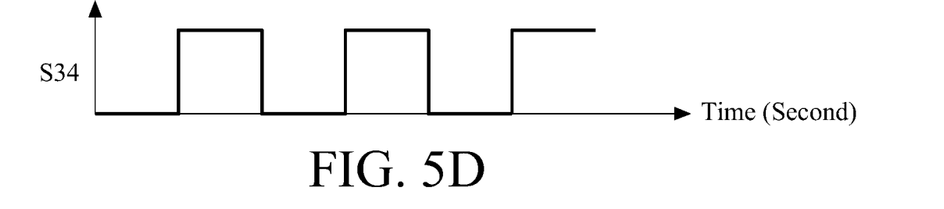
Figure 5E:
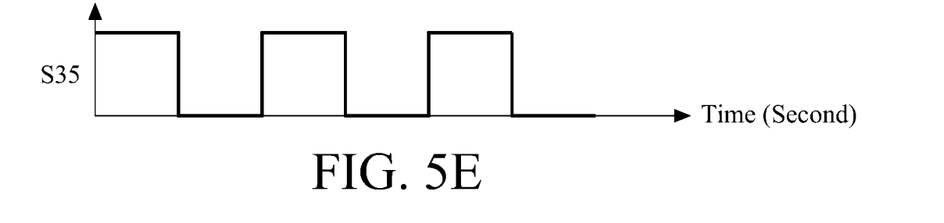
Figure 5F:
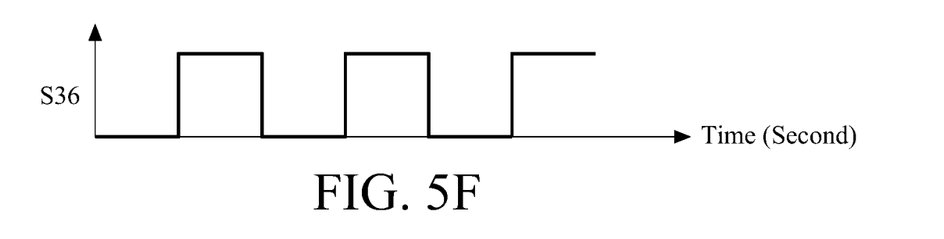
Figure 6A:
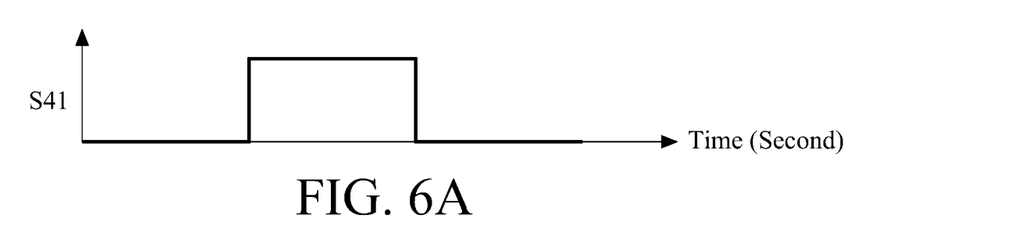
FIGS. 6A-6F are waveform diagrams of a PWM driving signal according to an embodiment of the present disclosure.
Figure 6B:
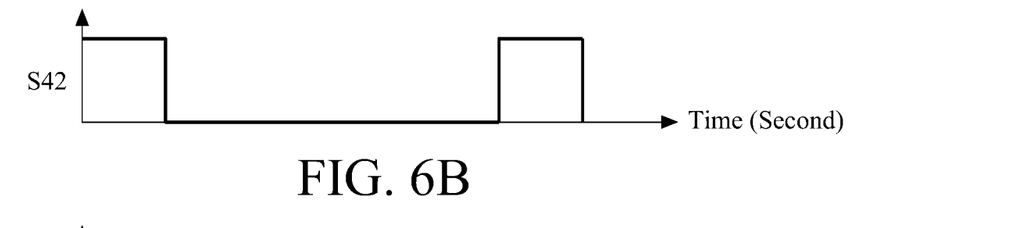
Figure 6C:
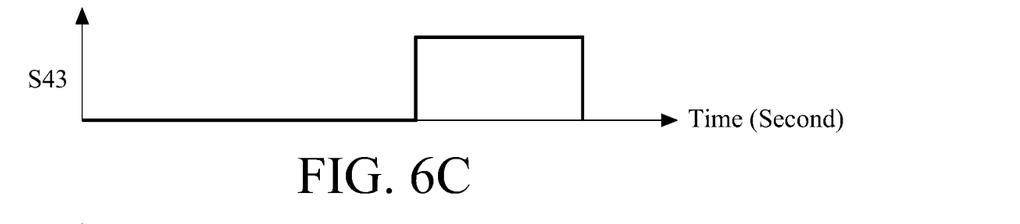
Figure 6D:
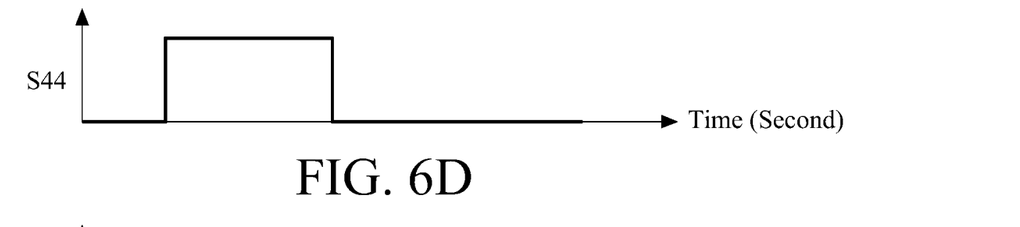
Figure 6E:
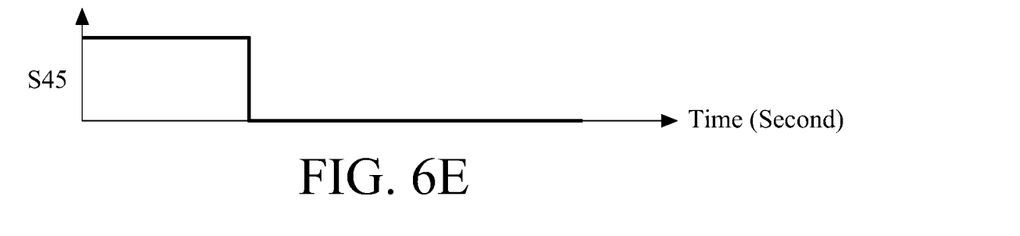
Figure 6F:
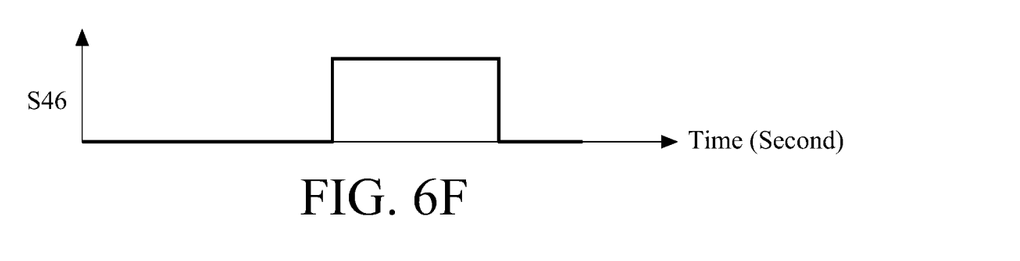

Please refer to FIG. 4 which is a circuit diagram of a motor driver according to an embodiment of the present disclosure. The motor driver 23 includes a first phase (U phase) upper arm driver 231, a first phase lower arm driver 232, a second phase (V phase) upper arm driver 233, a second phase lower arm driver 234, and a third phase (W phase) upper arm driver 235 and third phase lower arm driver 236. The first phase upper arm driver 231 is connected in series with the first phase lower arm driver 232, the second phase upper arm driver 233 is connected in series with the second phase lower arm driver 234, and the third phase upper arm driver 235 is connected in series with the third phase lower arm driver 236. In the present embodiment, each of the first phase upper arm driver 231, the first phase lower arm driver 232, the second phase upper arm driver 233, the second phase lower arm driver 234, the third phase upper arm driver 235, and the third phase lower arm driver 236 has a BJT transistor, and the gate of each BJT transistor serves as an input end for a driving signal or a braking signal. The brake judging circuit 221 is electrically connected to the input end of the first phase upper arm driver 231, the input end of the first phase lower arm driver 232, the input end of the second phase upper arm driver 233, and the input end of the second phase lower arm driver 234, the input end of the third phase upper arm driver 235 and the input end of the third phase lower arm driver 236. The assistive force judging circuit 222 is electrically connected to the input end of the first phase upper arm driver 231, the input end of the first phase lower arm driver 232, the input end of the second phase upper arm driver 233, and the input end of the second phase lower arm driver 234, the input end of the third phase upper arm driver 235 and the input end of the third phase lower arm driver 236.

FIGS. 5A-5F are waveform diagrams of a PWM braking signal according to an embodiment of the present disclosure. The PWM braking signal S3 includes a first phase upper arm braking signal S31, a first phase lower arm braking signal S32, a second phase upper arm braking signal S33, a second phase lower arm braking signal S34, a third phase upper arm braking signal S35 and a third phase lower arm braking signal S36. The first phase upper arm braking signal S31, the second phase upper arm braking signal S33 and the third phase upper arm braking signal S35 input to the first phase upper arm driver 231, the second phase upper arm driver 233 and the third phase upper arm driver 235 respectively. The first lower arm braking signal S32, the second phase lower arm braking signal S34 and the third phase lower arm braking signal S36 input to the first phase lower arm driver 232, the second phase lower arm driver 234 and the third phase lower arm driver 236 respectively. The first phase upper arm braking signal S31, the first phase lower arm braking signal S32, the second phase upper arm braking signal S33, the second phase lower arm braking signal S34, the third phase upper arm braking signal S35, and the third phase lower arm braking signal S36 have identical duty ratios, and each of the duty ratios is greater than 0 and less than or equal to 50%. When the first phase upper arm braking signal S31, the second phase upper arm braking signal S33, and the third phase upper arm braking signal S35 are at a high level, the first phase lower arm braking signal S32, the second phase lower arm braking signal S34, and the third phase lower arm braking signal S36 are all at a low level. The duty cycle can be adjusted according to the requirements of use, and the preferred duty ratio is 50% to protect the operating life of each driver.

The PWM braking signal S3 is used to restrain a rotation of a rotor 242 of the three-phase AC motor 24. After the motor driver 23 receives the PWM braking signal S3, a conduction sequence of the first phase upper arm driver 231, the first phase lower arm driver 232, the second phase upper arm driver 233, the second phase lower arm driver 234, the third phase upper arm driver 235, and the third phase lower arm driver 236 is as follows: at first stage, the first phase upper arm braking signal S31, the second phase upper arm braking signal S33 and the third phase upper arm brake signal S35 respectively make the first phase upper arm driver 231, the second phase upper arm driver 233 and the third phase upper arm driver 235 turn on. At the second stage the first phase lower arm braking signal S32, the second phase lower arm braking signal S34, and the third phase lower arm braking signal S36 respectively cause the first phase lower arm driver 232, the second phase lower arm driver 234 and the third phase arm driver 236 turn on. Therefore, a current does not flow through the upper arm driver and the lower arm driver at the same time and is only gradually consumed in a loop formed by the upper arm driver or the lower arm driver, so that a rotational speed of the rotor 242 of the three-phase alternating current motor 24 is gradually decreased.

FIGS. 6A-6F are waveform diagrams of a PWM driving signal according to an embodiment of the present disclosure. The PWM driving signal S4 includes a first phase upper arm driving signal S41, a first phase lower arm driving signal S42, a second phase upper arm driving signal S43, a second phase lower arm driving signal S44, and a third phase upper arm driving signal S45 and the third phase lower arm driving signal S46. The first phase upper arm driving signal S41, the second phase upper arm driving signal S43 and the third phase upper arm driving signal S45 respectively input to the input end of the first phase upper arm driver 231, the input end of the second phase upper arm driver 233 and the input end of the third phase upper arm driver 235. The first phase lower arm driving signal S42, the second phase lower arm driving signal S44 and the third phase lower arm driving signal S46 respectively input to the input end of the first phase lower arm driver 232, the input end of the second phase lower arm driver 234 and the input end of the third phase lower arm driver 236.

The PWM driving signal S4 is used to drive the rotor 242 of the three-phase AC motor 24 to rotate. After the motor driver 23 receives the PWM driving signal S4, a conduction sequence of the first phase upper arm driver 231, the first phase lower arm driver 232, the second phase upper arm driver 233, the second phase lower arm driver 234, the third phase upper arm driver 235 and the third phase lower arm driver 236 is as follows: at the first stage, the first phase lower arm driving signal S42 and the third upper arm driving signal S45 turns on the first phase lower arm driver 232 and the third phase upper arm driver 235 respectively. At the second stage, the second phase lower arm driving signal S44 and the third phase upper arm driving signal S45 respectively turn on the second phase lower arm driver 234 and the third phase upper arm driver 235. At the third stage, the first phase upper arm driving signal S41 and the second phase lower arm driving signal S44 respectively turn on the first phase upper arm driver 231 and the second phase lower arm driver 234. At the fourth stage, the first phase upper arm driving signal S41 and the third phase lower arm driving signal S46 respectively turn on the first phase upper arm driver 231 and the third phase lower arm driver 236. At the fifth stage, the second phase upper arm driving signal S43 and the third phase lower arm driving signal S46 respectively turn on the second phase upper arm driver 233 and the third phase lower arm driver 236. At the sixth stage, the second phase upper arm driving signal S43 and the first phase lower arm driving signal S42 respectively turn on the second phase upper arm driver 233 and the first phase lower arm driver 232, and the rotor 242 of the three-phase AC motor 24 rotates 60 degrees at each of the six stages.

On the other hand, when an absolute value of a voltage level of the first sensed signal S1 is larger, it means that an external force applied by the user to the wheelchair 200 is greater, so that it is convenient to understand that a user needs the electric wheelchair control system 100 to provide a greater assistive force according to the first sensed signal S1. Therefore, the first phase upper arm driving signal S41, an amplitude of each of the first phase lower arm driving signal S42, the second phase upper arm driving signal S43, the second phase lower arm driving signal S44, the third phase upper arm driving signal S45 and third phase lower arm driving signal S46 outputted by the assistive force judging circuit 222 is proportional to the absolute value of the voltage level of the first sensed signal S1. When the amplitude of the PWM drive signal S4 is increased, an output torque of the three-phase AC motor 24 is also increased, thereby providing the user with a appropriate assistance.

Figure 7:
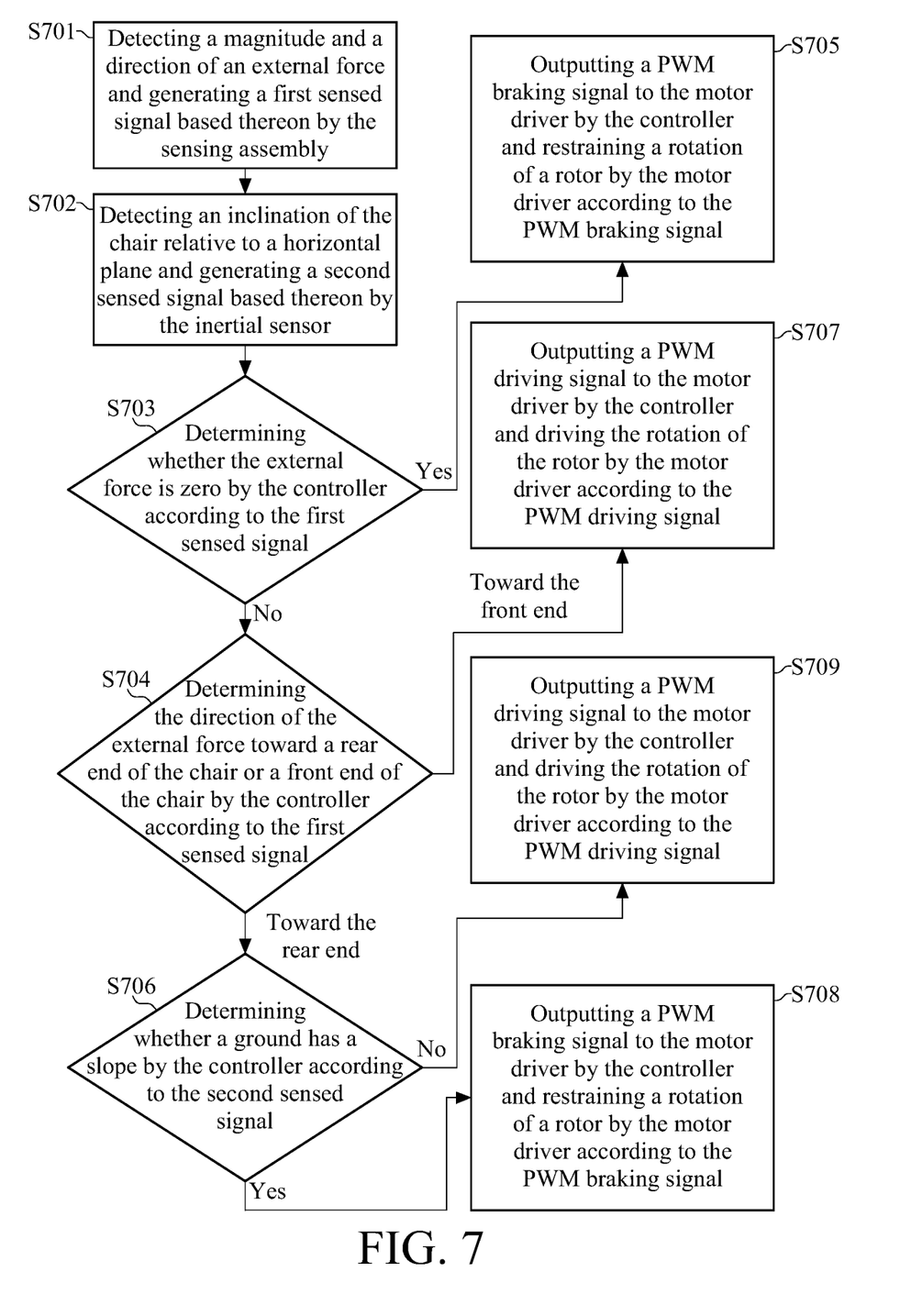
FIG. 7 is flow chart of an electric wheelchair control method according to an embodiment of the present disclosure.
Figure 8:
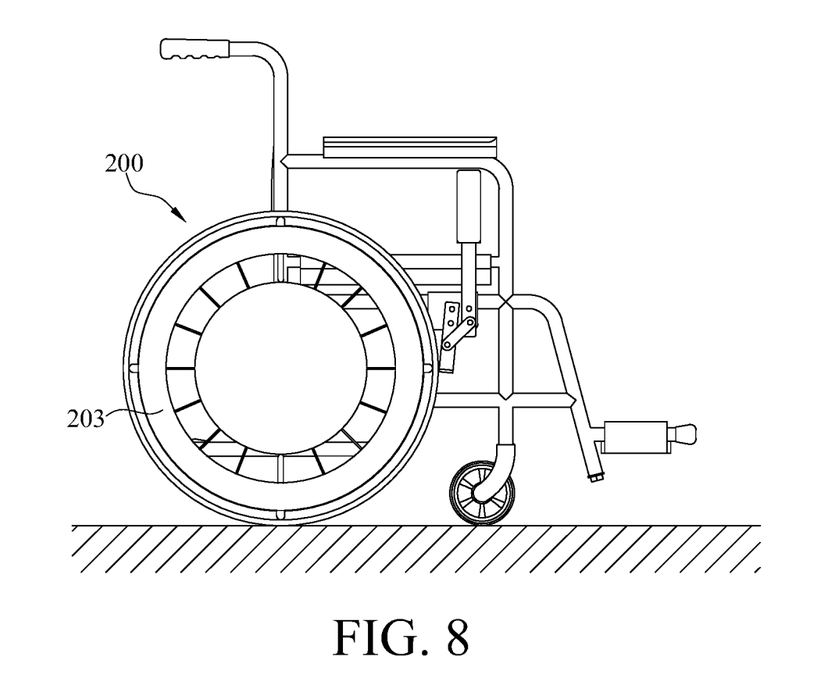
FIG. 8 is a schematic view of an electric wheelchair control method adapted to a wheelchair in a first state.
Figure 9:
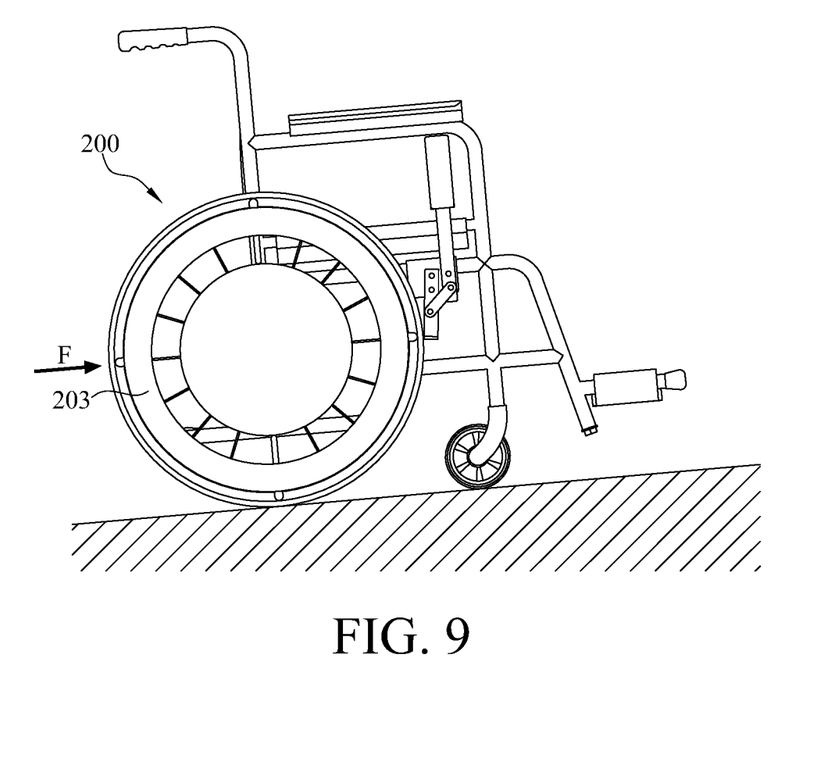
FIG. 9 is a schematic view of an electric wheelchair control method adapted to a wheelchair in a second use state.
Figure 10:
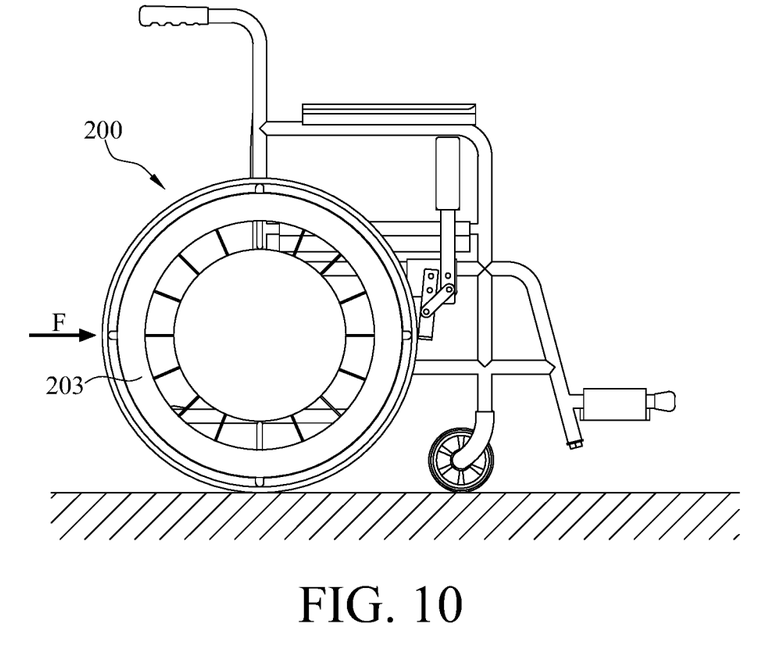
FIG. 10 is a schematic view of an electric wheelchair control method adapted to a wheelchair in a third use state.
Figure 11:
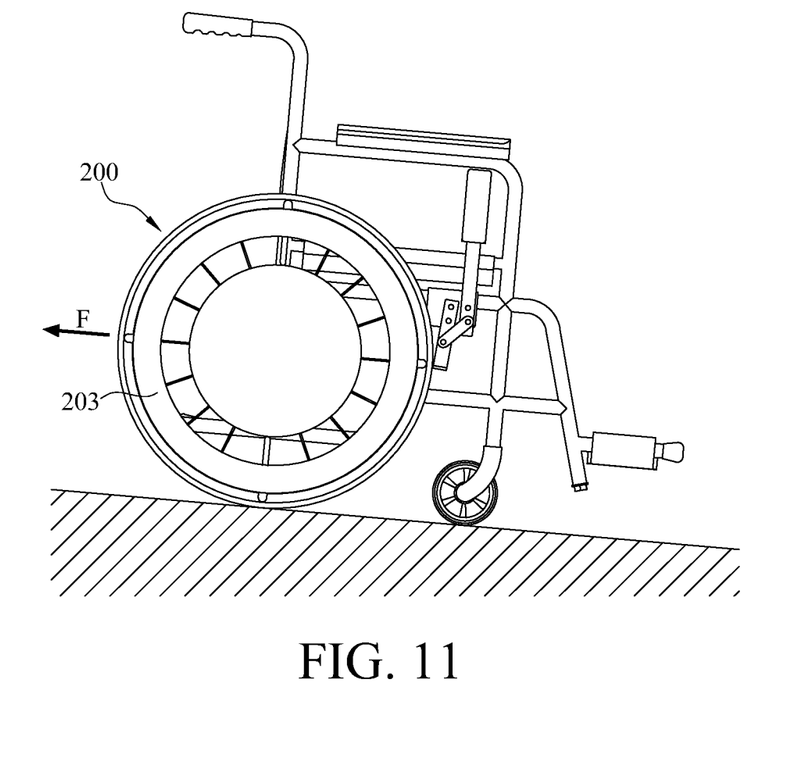
FIG. 11 is a schematic view of an electric wheelchair control method adapted to a wheelchair in a fourth use state.

FIG. 7 is flow chart of an electric wheelchair control method according to an embodiment of the present disclosure. FIG. 8 is a schematic view of an electric wheelchair control method applied to a wheelchair in a first state. FIG. 9 is a schematic view of an electric wheelchair control method adapted to a wheelchair in a second use state. FIG. 10 is a schematic view of an electric wheelchair control method adapted to a wheelchair in a third use state. FIG. 11 is a schematic view of an electric wheelchair control method adapted to a wheelchair in a fourth use state. Referring to FIG. 1 and FIG. 7 together, the electric wheelchair control method is used to control the wheelchair 200 and is executed by the electric wheelchair control system 100. Step S701 is detecting a magnitude and a direction of an external force applied by the user to the hand wheel 203 of the wheelchair 200 and generating a first sensed signal S1 based thereon by the sensing assembly 10 for. In this embodiment, when the external force applied by the user to the hand wheel 203 is larger, an absolute value of a voltage level (or current level) of the first sensed signal S1 is higher. In one embodiment, when the voltage level of the first sensing signal S1 is a positive value, it indicates that the direction of the external force applied by the user is toward the front end of the chair 201. When the voltage level of the first sensed signal S1 is a negative value, it indicates that the direction of the external force applied by the user is toward the rear end of the chair 201. When the voltage level of the first sensing signal S1 is zero, it indicates that the user does not apply any external force to the hand wheel 203 of the wheelchair 200.

Step S702 is detecting an inclination of the chair 201 relative to a horizontal plane and generating a second sensed signal S2 based thereon by the inertial sensor 21. In one embodiment, when a voltage level of the second sensed signal S2 is zero, it indicates that a ground on which the wheelchair 200 is located is a flat ground. On the contrary, when the voltage level of the second sensed signal S2 is not zero, it indicates that the ground on which the wheelchair 200 is located is a sloped ground. Step S703, determining whether the external force is zero by the assistive force judging circuit 222 of the controller 22 according to the first sensed signal S1. When the assistive force judging circuit 222 determines that the external force is not zero, step S704 is performed. When the assistive force judging circuit 222 determines that the external force is zero, step S705 is performed.

Step S704 is determining the direction of the external force toward the rear end of the chair 201 or toward the front end of the chair 201 by the assistive force judging circuit 222 of the controller 22 according to the first sensed signal S1. If the direction of the external force is toward the rear end of the chair 201, step S706 is performed. If the direction of the external force is toward the front end of the chair 201, step S707 is performed.

Referring to FIG. 7 and FIG. 8 together, FIG. 8 shows that the user does not apply an external force to the wheelchair 200. In this case, the electric wheelchair control system 100 performs step S705. Step S705 is outputting a PWM braking signal S3 to the motor driver 23 by the brake judging circuit 221 of the controller 22 and restraining the rotation of the rotor 242 of the power device 20 by the motor driver 23 according to the PWM braking signal S3. The upper arm braking signal and the lower arm braking signal of the PWM braking signal S3 have the same duty ratio. When the upper arm braking signal is at the high level, the lower arm braking signal is at a low level, so a current does not flow through the upper arm driver and the lower arm driver whose phase is different from the phase of the upper arm driver and is only gradually consumed in a loop formed by the upper arm driver or the lower arm driver, thereby achieving the purpose of braking.

Step S706 is determining whether the ground has a slope by the controller 22 according to the second sensed signal S2. If the ground has a slope, step S708 is performed. If the ground has no slope, step S709 is performed.

Referring to FIG. 7, FIG. 9, and FIG. 10 together, FIG. 9 shows that the wheelchair 200 is located at a sloped ground and the external force F applied by the user to the hand wheel 203 of the wheelchair 200 toward the front end of the chair 201, FIG. 10 shows that the wheelchair 200 is located at a flat ground and the external force F applied by the user to the hand wheel 203 of the wheelchair 200 toward the front end of the chair 201. Whether the ground has a slope or not, as long as the external force applied by the user to the hand wheel 203 is toward the front end of the chair 201, the electric wheelchair control system 100 performs step S707. Step S707 is outputting a PWM driving signal S4 to the motor driver 23 by the assistive force judging circuit 222 and the driving the rotation of the rotor 242 by the motor driver 23 according to the PWM driving signal S4. On the other hand, the amplitude of the PWM driving signal S4 is proportional to the absolute value of the voltage level of the first sensed signal S1. When the amplitude of the PWM driving signal S4 is larger, an output torque of the three-phase AC motor 24 is larger.

Referring to FIG. 7 and FIG. 11 together, FIG. 11 shows that the wheelchair 200 is located at a sloped ground and the external force F applied by the user to the hand wheel 203 of the wheelchair 200 toward the rear end of the chair 201. In this case, the electric wheelchair control system 100 performs step S708. Step S708 is outputting a PWM braking signal S3 to the motor driver 23 by the brake judging circuit 221 of the controller 22 and restraining the rotation of the rotor 242 of the three-phase AC motor 24 by the motor driver 23 according to the PWM braking signal S3. The upper arm braking signal and the lower arm braking signal of the PWM braking signal S3 have the same duty ratio and when the upper arm braking signal is at a high level, the lower arm braking signal is at a low level, thereby achieving the purpose of braking.

Step S709 is outputting a PWM driving signal S4 to the motor driver 23 by the assistive force judging circuit 222 and driving the rotation of the rotor 242 of the three-phase AC motor 24 by the motor driver 23 according to the PWM driving signal S4, and the amplitude of the PWM driving signal S4 is proportional to the absolute value of the voltage level of the first sensed signal S1.

In view of the above description, when the wheelchair travels on the sloped ground and the external force applied by the user to the hand wheel to the wheel assembly is toward the front end of the chair, the controller can automatically output a PWM driving signal to the motor driver to drive the rotation of the three-phase AC motor. When the three-phase AC motor rotates, it can drive the road wheel to rotate. As a result, even if the user does not push the hand wheel forward, the wheelchair will move forward along the sloped ground for saving effort. On the contrary, when the wheelchair travels on the sloped ground and the external force applied by the user to the hand wheel is toward the rear end of the chair, the controller can automatically output the PWM braking signal to the motor driver to restrain the rotation of the three-phase AC motor. Therefore, even if the user does not push the hand wheel backward, the wheelchair will not slide down along the sloped ground. On the other hand, since the upper arm braking signal and the lower arm braking signal of the PWM braking signal have identical duty ratios and the lower arm braking signal is at a low level when the upper arm braking signal is at a high level, the current does not flow through the upper arm driver and the lower arm driver at the same time and is only gradually consumed in a loop formed by the upper arm driver or the lower arm driver, so that the rotational speed of the three-phase AC motor is gradually decreased and the three-phase AC motor is not immediately changed to a locked state. As a result, the user does not feel uncomfortable even if the electric wheelchair control system is braking on the sloped ground. On the other hand, the electric wheelchair control system does not have any additional hydraulic brakes or electronic brakes, which is advantageous for the development of miniaturization.

What is claimed is:

1. An electric wheelchair control system, adapted to control a wheelchair, with the wheelchair comprising a chair and a wheel assembly, and the electric wheelchair control system comprising:

a sensing assembly, configured to assemble with the wheel assembly, with the sensing assembly detecting a magnitude and a direction of an external force and generating a first sensed signal based thereon; and a power device electrically connected with the sensing assembly and configured to connect between the chair and the wheel assembly, and the power device further comprising:

an inertial sensor, configured to detect an inclination of the chair relative to a horizontal plane, with the inertial sensor generating a second sensed signal based thereon;

a three-phase alternating current motor having a rotor configured to assemble with the wheel assembly and a stator configured to assemble with the chair;

a motor driver electrically connected with the three-phase alternating current motor, wherein the motor driver includes a first phase upper arm driver, a first phase lower arm driver, a second phase upper arm driver, a second phase lower arm driver, a third phase upper arm driver, and a third phase lower arm driver; and a controller electrically connected with the inertial sensor, the sensing assembly and the motor driver, wherein the controller selectively outputs a PWM braking signal to the motor driver according to the first sensed signal and the second sensed signal, the motor driver restrains a rotation of the rotor according to the PWM braking signal, the PWM braking signal includes a first phase upper arm braking signal, a first phase lower arm braking signal, a second phase upper arm braking signal, a second phase lower arm braking signal, a third phase upper arm braking signal, and a third phase lower arm braking signal, the first phase upper arm driver, the second phase upper arm driver, and the third phase upper arm driver respectively receive the first phase upper arm braking signal, the second phase upper arm braking signal and the third phase upper arm braking signal, and the first phase lower arm driver, the second phase lower arm driver, and the third phase lower arm driver respectively receive the first phase lower arm braking signal, the second phase lower arm braking signal and the third phase lower arm braking signal, the first phase upper arm braking signal, the first phase lower arm braking signal, the second phase upper arm braking signal, the second phase lower arm braking signal and the third phase lower arm braking signal have identical duty ratios, the first phase lower arm braking signal, the second phase lower arm braking signal and the third phase lower arm braking signal are at low levels respectively when the first phase upper arm braking signal and the second phase upper arm braking signal are at high levels respectively.

2. The electric wheelchair control system in claim 1, wherein the controller includes an assistive force judging circuit that selectively outputs a PWM driving signal to the motor driver according to the first sensed signal and the second sensed signal, and the motor driver drives the rotation of the rotor according to the PWM driving signal.

3. The electric wheelchair control system in claim 2, wherein an amplitude of the PWM driving signal is proportional to a magnitude of the first sensed signal.

4. The electric wheelchair control system in claim 1, wherein a sensing frequency of the inertial sensor is at least 100 times per one second, and a sensing frequency of the sensing assembly is at least 100 times per one second.

5. An electric wheelchair control method, adapted to control a wheelchair and performed by an electric wheelchair control system, with the wheelchair comprising a chair and a wheel assembly, the electric wheelchair control system including a sensing assembly, an inertial sensor, a three-phase alternating current motor, a motor driver and a controller, the electric wheelchair control method comprising:
   detecting a magnitude and a direction of an external force applied to the wheel assembly and generating a first sensed signal based thereon by the sensing assembly;
   detecting an inclination of the chair relative to a horizontal plane and generating a second sensed signal based thereon by the inertial sensor;
   determining whether the external force is zero by the controller according to the first sensed signal;
   determining whether the direction of the external force is towards a rear end of the chair or a front end of the chair by the controller according to the first sensed signal when the external force is not zero;
   determining whether a ground where the wheelchair is located has a slope by the controller according to the second sensed signal; and
   outputting a PWM braking signal to the motor driver by the controller when the direction of the external force is toward the rear end of the chair and the ground has a slope, wherein the motor driver restrains a rotation of a rotor of the three-phase alternating current motor according to the pulse width modulation braking signal, the motor driver includes a first phase upper arm driver, a first phase lower arm driver, a second phase upper arm driver, a second phase lower arm driver, a third phase upper arm driver, and a third phase lower arm driver, the PWM braking signal includes a first phase upper arm braking signal, a first phase lower arm braking signal, a second phase upper arm braking signal, a second phase lower arm braking signal, a third phase upper arm braking signal, and a third phase lower arm braking signal, the first phase upper arm driver, the second phase upper arm driver, and the third phase upper arm driver respectively receive the first phase upper arm braking signal, the second phase upper arm braking signal and the third phase upper arm braking signal, and the first phase lower arm driver, the second phase lower arm driver, and the third phase lower arm driver respectively receive the first phase lower arm braking signal, the second phase lower arm braking signal and the third phase lower arm braking signal, the first phase upper arm braking signal, the first phase lower arm braking signal, the second phase upper arm braking signal, the second phase lower arm braking signal, the third phase upper arm braking signal and the third phase lower arm braking signal have identical duty ratios, the first phase lower arm braking signal, the second phase lower arm braking signal and the third phase lower arm braking signal are at low levels respectively when the first phase upper arm braking signal and the second phase upper arm braking signal are at high levels respectively.

6. The electric wheelchair control method in claim 5, further comprising outputting a PWM driving signal to the motor driver by the controller when the external force is toward the front end of the chair and the ground has a slope, and driving the rotation of the rotor by the motor driver according to the PWM driving signal.

7. The electric wheelchair control method in claim 5, wherein an amplitude of the PWM driving signal is proportional to the magnitude of the first sensed signal.

8. The electric wheelchair control method in claim 5, further comprising outputting a PWM driving signal to the motor driver by the controller when the external force is toward the front end of the chair and the ground has no slope, and driving the rotation of the rotor by the motor driver according to the PWM driving signal.

9. The electric wheelchair control method in claim 8, wherein an amplitude of the PWM driving signal is proportional to the magnitude of the first sensed signal.

10. The electric wheelchair control method in claim 5, further comprising outputting the PWM braking signal to the motor driver by the controller when the external force is zero.

11. An electric wheelchair control system, adapted to control a wheelchair, with the wheelchair comprising a chair and a wheel assembly, and the electric wheelchair control system comprising:
   a sensing assembly, wherein the sensing assembly include a hand wheel sensor and a road wheel sensor, the wheel assembly includes a hand wheel and a road wheel which are disposed coaxially, the hand wheel and the road wheel are respectively provided with first and second pressing members, the first and second pressing members respectively press the hand wheel sensor and the road wheel sensor at two pressed positions and the first and second pressed positions are respectively displaced along with the hand wheel and the road wheel when the hand wheel and the road wheel rotate, a magnitude and a direction of an external force applied to the hand wheel is calculated according to a difference between a displacement of the first pressing member relative to the hand wheel sensor and a displacement of the second pressing member relative to the road wheel sensor for generating a first sensed signal; and
   a power device electrically connected with the sensing assembly and configured to connect between the chair and the wheel assembly, and the power device further comprising:
   an inertial sensor, configured to detect an inclination of the chair relative to a horizontal plane, with the inertial sensor generating a second sensed signal based thereon;
   a three-phase alternating current motor having a rotor configured to assemble with the wheel assembly and a stator configured to assemble with the chair;
   a motor driver electrically connected with the three-phase alternating current motor, wherein the motor driver includes a first phase upper arm driver, a first phase lower arm driver, a second phase upper arm driver, a second phase lower arm driver, a third phase upper arm driver, and a third phase lower arm driver; and a controller electrically connected with the inertial sensor, the sensing assembly and the motor driver, wherein the controller selectively outputs a PWM braking signal to the motor driver according to the first sensed signal and the second sensed signal, the motor driver restrains a rotation of the rotor according to the PWM braking signal, the PWM braking signal includes a first phase upper arm braking signal, a first phase lower arm braking signal, a second phase upper arm braking signal, a second phase lower arm braking signal, a third phase upper arm braking signal, and a third phase lower arm braking signal, the first phase upper arm driver, the second phase upper arm driver, and the third phase upper arm driver respectively receive the first phase upper arm braking signal, the second phase upper arm braking signal and the third phase upper arm braking signal, and the first phase lower arm driver, the second phase lower arm driver, and the third phase lower arm driver respectively receive the first phase lower arm braking signal, the second phase lower arm braking signal and the third phase lower arm braking signal, the first phase upper arm braking signal, the first phase lower arm braking signal, the second phase upper arm braking signal, the second phase lower arm braking signal and the third phase lower arm braking signal have identical duty ratios, the first phase lower arm braking signal, the second phase lower arm braking signal and the third phase lower arm braking signal are at low levels respectively when the first phase upper arm braking signal and the second phase upper arm braking signal are at high levels respectively.

12. The electric wheelchair control system in claim 11, wherein the hand wheel sensor and the road wheel sensor are film displacement sensors and are spaced apart from each other and attached to a surface of an outer casing of the power device.

13. The electric wheelchair control system in claim 11, wherein each of the first and second pressing members is a combination of a steel ball and a spring.

14. The electric wheelchair control system in claim 11, wherein the direction of the external force applied to the hand wheel is toward the front end of the chair when the displacement of the first pressing member relative to the hand wheel sensor is greater than the displacement of the second pressing member relative to the road wheel sensor, the direction of the external force applied to the hand wheel is toward the rear end of the chair when the displacement of the first pressing member relative to the hand wheel sensor is smaller than the displacement of the second pressing member relative to the road wheel sensor.

* * * * *